United States Patent

[11] 3,622,571

[72] Inventors Francis Joseph McEvoy
Pearl River, N.Y.;
George Rodger Allen, Jr., Old Tappan, N.J.
[21] Appl. No. 848,685
[22] Filed Aug. 8, 1969
[45] Patented Nov. 23, 1971
[73] Assignee American Cyanamid Company
Stamford, Conn.
Continuation-in-part of application Ser. No. 747,832, July 26, 1968, now abandoned.
This application Aug. 8, 1969, Ser. No. 848,685

[54] VINYL-SUBSTITUTED PHTHALANS
8 Claims, No Drawings
[52] U.S. Cl. .................................................. 260/240 D,
260/240 E, 260/247.7, 260/268 H, 260/294.7 D,
260/326.85, 260/346.2 R, 260/999
[51] Int. Cl. ...................................................... C07d 5/32

[50] Field of Search ............................................ 260/346.2
R, 240 D, 240 E, 268

[56] References Cited
OTHER REFERENCES

Chemical Abstracts I, vol. 64, cols. 3448 to 3449 (1966)
Chemical Abstracts II, vol. 66, page 3595, abstract No. 37770 (1967)
Chemical Abstracts III, vol. 66, pages 6143 to 6144 (abstract No. 65,392 m) April 10, 1967

*Primary Examiner*—John D. Randolph
*Attorney*—Ernest Y. Miller

ABSTRACT: Organic compounds of the class vinyl substituted phthalans are preared chemically from the corresponding vinyl isobenzofurylium compounds. The novel compounds are useful for their antidepressant activity.

VINYL-SUBSTITUTED PHTHALANS

This application is a continuation-in-part of application Ser. No. 747,832, filed July 26, 1968, now abandoned.

SUMMARY OF THE INVENTION

This invention relates to novel organic compounds and is more particularly concerned with novel vinyl substituted phthalans and method of preparation.

The novel compounds of this invention can be represented by the following formula:

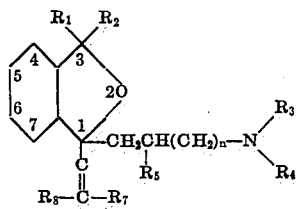

wherein $R_1$ and $R_2$ are members of the group consisting of hydrogen and lower alkyl; $R_3$ is a member of the group consisting of hydrogen, lower alkyl, and lower alkoxycarbonyl; $R_4$ is lower alkyl; $R_3$ and $R_4$ taken together with nitrogen is a member of the group consisting of 4-morpholinyl, polymethyleneimino, 1-lower alkyl-4-piperazinyl, 1-piperazinyl, and 1-lower alkoxy carbonyl-4-piperazinyl; $R_5$ is a member of the group consisting of hydrogen and lower alkyl; $R_6$ and $R_7$ are members of the group consisting of hydrogen, and lower alkyl; $R_8$ is a member of the group consisting of thienyl, furyl, indanyl, naphthyl, lower alkoxynaphthyl, phenyl, cycloalkylphenyl, halophenyl, $\alpha,\alpha,\alpha$-trifluorotolyl, lower alkylphenyl, methoxyphenyl, dimethoxyphenyl, trimethoxyphenyl, and biphenyl; $n$ is an integer of one to three, and nontoxic acid addition salts thereof.

The novel compounds of this invention react with lower alkyl halides to form lower alkyl quaternary ammonium halides. These salts are also within the scope of the present invention.

The novel compounds are, in general, basic, off-white or tan colored, gummy solids. Acid addition salts of the compounds, as for example, salts of fumaric, hydrochloric, sulfuric, oxalic or perchloric acid, are crystalline solids. The novel compounds of the present invention can be prepared as shown in the following flowsheet.

FLOWSHEET

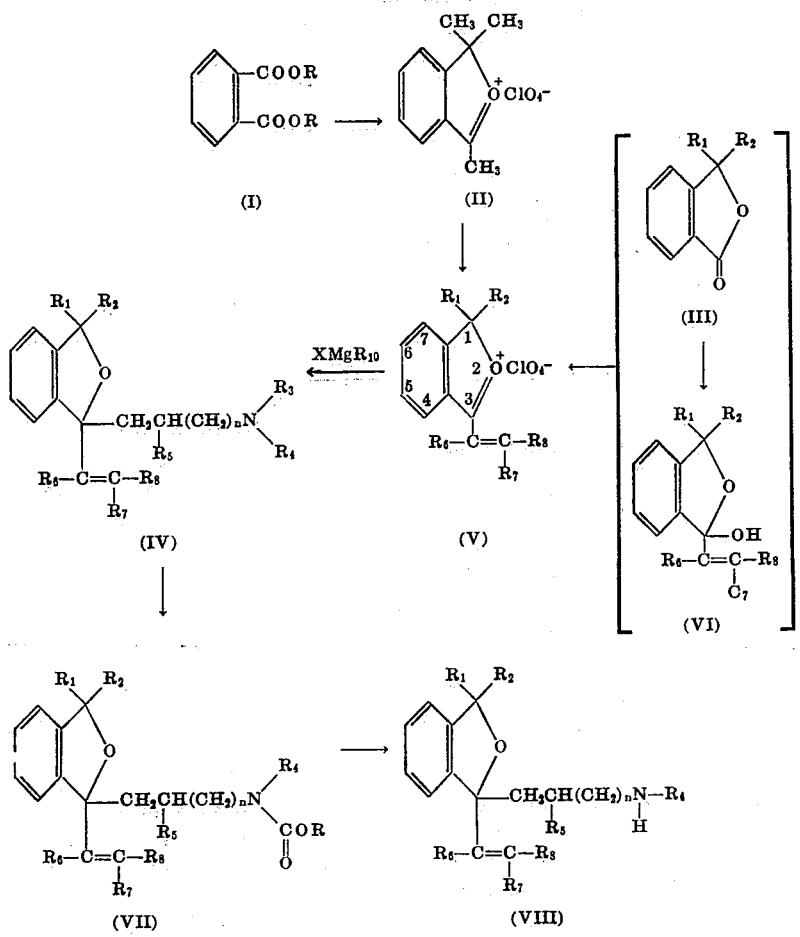

wherein $R_1$, $R_2$, $R_3$, $R_4$, $R_5$, $R_6$, $R_7$, $R_8$ and $n$ are as defined hereinbefore, R is lower alkyl, X is halogen and $R_{10}$ is

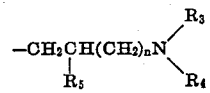

In accordance with the above flowsheet, treatment of a lower alkyl o-phthalate (I) with a methyl magnesium halide, followed by treatment with perchloric acid gives the oxonium perchlorate (II). Treatment of this substrate with a substituted benzaldehyde, naphthaldehyde, a substituted naphthaldehyde, indamecarboxaldehyde, thiophenecarboxaldehyde, or furancarboxaldehyde furnishes the vinyloxonium perchlorate (V). Alternately, (V) may be prepared from phthalide or a 3,3-disubstituted phthalide (III). Thus, reaction of (III) with a styryl magnesium halide affords the 1-styryl-1-hydroxyphthalan (VI), which is transformed by perchloric acid into the styryloxonium perchlorate (V). Treatment of this oxonium salt with the appropriate organometallic derivative furnishes the 1-aminosubstituted alkyl-1-styrylphthalan (IV). This latter reaction is generally carried out in the presence of an excess of the appropriate Grignard reagent in order to insure an effective alkylation in a reasonable period of time. These alkylation reactions are usually carried out in an inert solvent such as diethyl ether, tetrahydrofuran, dioxane ethylene glycol dimethyl ether, diethylene glycol, dibutyl ether, and the like. Particularly advantageous is the use of diethylene glycol dibutyl ether. These reactions are generally conducted at temperatures of between about 30° C. and about 120° C., with the preferred temperature being from about 60° C. to 100° C. When the alkylation has been achieved, usually after heating from about 4 to about 24 hours, the desired products (IV) are generally obtained by decomposing the excess Grignard reagent, followed by purification of the crude product by methods well known to those skilled in the art. Compounds of formula (IV) serve as intermediates for the preparation of other compounds of the present invention. Thus, when the compounds of formula (IV), wherein $R_3$ is methyl, are treated with a lower alkoxy carbonyl halide, the urethans (VII) result. Saponification of (VII) affords the compounds (VIII). Similar treatment of compounds of formula (IV) wherein $R_3$ and $R_4$ taken together with nitrogen

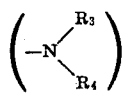

is 1-lower alkyl-4-piperazinyl, e.g., (IX), affords the urethans (X), which on saponification furnish the 1-piperazinyl derivatives (XI). The transformations of (IX) to the 1-piperazinyl derivatives (XI) are illustrated schematically below.

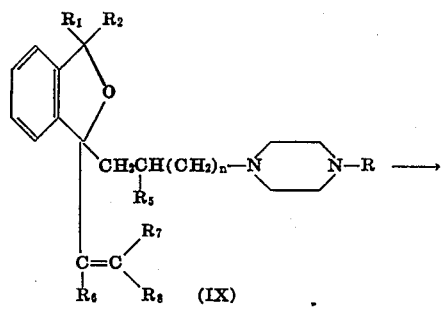

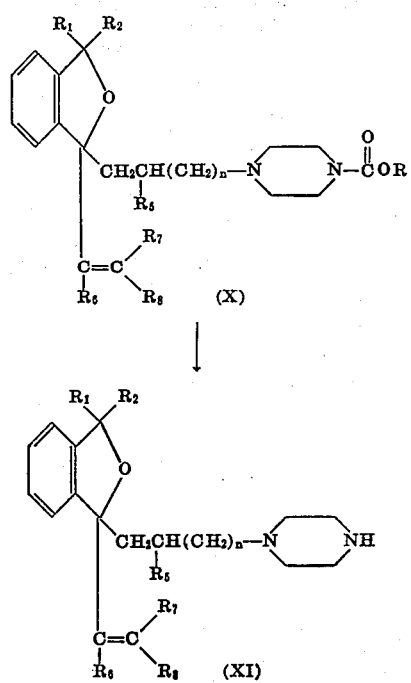

wherein R, $R_1$, $R_2$, $R_5$, $R_6$, $R_7$, $R_8$ and $n$ are as defined hereinbefore.

The compounds of this invention are physiologically active having an antidepressant effect upon the central nervous system. The administration antidepressant properties of the novel compounds are shown by measuring the ability of the compounds to counteract depression induced in animals by the administration of tetrabenzaine hexamate, a well-known central nervous system depressant. Generally, the compounds of this invention shown antidepressant activity at dosage levels which produce neither overt stimulation nor depression.

In the test procedure, graded doses of the present compounds to be tested are administered to groups of mice, and this is followed by administering a dose of tetrabenazine hexamate which is known to markedly depress the exploratory behavior of normal mice. Control groups of mice are not given the test compound. The antidepressant treated groups (i.e., groups given the test compound) show normal exploratory behavior, while the control groups, and groups treated with an ineffective antidepressant agent, do not show this normal exploratory behavior, but in contrast show the well-known, profound depression induced by tetrabenazine hexamate.

The results obtained from several dose levels are used to establish effective dose ranges. The active compounds of this invention show their antidepressant properties by this procedure at dose levels which produce little or no untoward reactions, as for example, ataxia or reduced spontaneous motor activity. The present novel compounds, therefore, are useful as effective antidepressant agents, acting upon the central nervous system when administered orally or parenterally, generally in the form of their salts. For oral administration the new compounds of this invention may be incorporated with the usual pharmaceutical excipients and used, for example, in the form of tablets, capsules dragees, liquids to be administered in drops, emulsions, suspensions and syrups, and in chocolate, candy, and the like. The compounds may also be administered in suppositories, and in sterile suspensions for parenteral injection.

The following examples describe in greater detail the preparation of representative 1-vinyl substituted phthalans of the present invention.

EXAMPLE 1

Preparation of 1,1-Dimethyl-3-styryl-1H-isobenzofurylium Perchlorate

To 1,200 ml. of 1.5 molar methyl magnesium bromide in ether stirred at 0° C. is added dropwise an ethereal solution of 100 g. (0.45 mole) of diethylphthalate. The mixture is stirred at 0°-5° C. for 2 hours and the resultant complex is decomposed with hydrochloride acid. The organic phase is separated, washed with water and evaporated under reduced pressure leaving an amber oil. The amber oil is dissolved in glacial acetic acid and treated with perchloric acid affording 1,1,3-trimethyl-1H-isobenzofurylium perchlorate, melting point 162°-164°C., Dec.

To a warm solution of 2.12 g. (0.0081 mole) of 1,1,3-trimethyl-1H-isobenzofurylium perchlorate in 40 ml. of glacial acetic acid is added 1.08 ml. (0.0097 mole) of benzaldehyde. The mixture is stirred and refluxed for 30 minutes, then cooled and filtered affording 2.60 g. of 1,1-dimethyl-3-styryl-1H-isobenzofurylium perchlorate, melting point 187°-191°C., Dec.

EXAMPLE 2

Preparation of N,N,3,3-Tetramethyl-1-styryl-1-phthalanpropyl-amine (oxalate)

To a stirred, refluxing solution of 3.2 g. (0.02 mole) of 3,3-dimethylphthalide in 10 ml. of tetrahydrofuran is added 15 ml. of a tetrahydrofuran solution of styryl magnesium bromide [from 5.50 g. (0.03 mole) styryl bromide and 720 mg. (0.03 mole) magnesium]. The mixture is stirred while refluxing for 18 hours, then cooled and the complex decomposed with ammonium chloride solution. The organic phase is separated and the aqueous solution extracted with ether. The combined organic solutions are washed with water, dried with magnesium sulfate and evaporated under reduced pressure. The semisolid residue on treatment with petroleum ether (30°-60° C.) gives 2.61 g. of 3,3-dimethyl-1-styryl-1-phthalanol, melting point 130°-135°C.

A solution of 1.1 g. of the above 3,3-dimethyl-1-styryl-1-phthalanol in 220 ml. of ether when treated with a solution of perchloric acid in ether produces 1.1 g. of 1,1-dimethyl-3-styryl-1H-isobenzofurylium perchlorate, melting point 183°C.

To a stirred, refluxing solution of dimethylaminopropyl magnesium chloride (from 288 mg. of magnesium and 1.46 g. of dimethylaminopropyl chloride) in 25 ml. of tetrahydrofuran is added portionwise 1.05 g. of 1,1-dimethyl-3-styryl-1H-isobenzofurylium perchlorate. The mixture is stirred and refluxed for 18 hours, then cooled and decomposed with ammonium chloride solution. The solution is extracted with ether. The ether extract is extracted with 20 percent acetic acid. The acid extract is made alkaline with sodium hydroxide and extracted with ether. This organic extract is washed with water, dried with magnesium sulfate and evaporated under reduced pressure giving 950 mg. of N,N,3,3-tetramethyl-1-styryl-1-phthalanpropylamine as a gum. The oxalate salt melts at 196°-197° C., and the fumarate salt melts at 156°-158° C.

EXAMPLE 3

Preparation of N,N,3,3-Tetramethyl-1-(p-methylstyryl)-1-phthalanpropylamine (oxalate)

In the manner described in example 1 from 920 mg. of 1,1,3-trimethyl-1H-isobenzofurylium perchlorate and 0.41 ml. of 4-methylbenzaldehyde is obtained 1.13 g. of 1,1-dimethyl-3-(p-methylstyryl)-1H-isobenzofurylium perchlorate, melting point 210°-212°, dec.

In the manner described in example 2 using 1.13 g. of 1,1-dimethyl-3-(p-methylstyryl)-1H-isobenzofurylium perchlorate in place of 1,1-dimethyl-3-styryl-1H-isobenzofurylium perchlorate there is obtained the oxalate salt of N,N,3,3-tetramethyl-1-(p-methylstyryl)-1-phthalan-propylamine, melting point 186°-188°C.

EXAMPLE 4

Preparation of N,N,3,3-tetramethyl-1-(p-methoxystyryl)-1-phthalanpropylamine (oxalate)

In the manner described in example 1 from 800 mg. of 1,1,3-trimethyl-1H-isobenzofurylium perchlorate and 0.37 ml. of 4-methoxybenzaldehyde is obtained 1.11 g. of 1,1-dimethyl-3-(p-methoxystyryl)-1H-isobenzofurylium perchlorate, melting point 225°-228° C., dec.

Following the procedure described in example 2 using 1.11 g. of 1,1-dimethyl-3-(p-methoxystyryl)-1H-isobenzofurylium perchlorate there is obtained the oxalate salt of N,N,3,3-tetramethyl-1-(p-methoxystyryl)-1-phthalanpropylamine, melting point 198°-200° C. The hydrochloride salt melts at 164°-165°C.

EXAMPLE 5

Preparation of N,N,3,3-Tetramethyl-1-(p-chlorostyryl)-1-phthalan-propylamine (oxalate)

Following the procedure described in example 1 from 950 mg. of 1,1,3-triemthyl-1H-isobenzofurylium perchlorate and 616 mg. of 4-chlorobenzaldehyde is obtained 1.28 g. of 1,1-dimethyl-3-(p-chlorostyryl)-1H-isobenzofurylium perchlorate, melting point 195°-198°C., dec.

In the manner described in example 2 using 1.28 g. of 1,1-dimethyl-3p-chlorostyryl 1H-isobenzofurylium perchlorate there is obtained the oxalate salt of N,N,3,3-tetramethyl-1-(p-chlorostyryl)-1-phthalanpropylamine, melting point 222°-223° C.

EXAMPLE 6

Preparation of N,N,3,3Tetramethyl-1-(m-chlorostyryl)-1-phthalanpropylamine.

When the procedure described in example 1 is followed using 1.3 g. of 1,1,3-trimethyl-1H-isobenzofurylium perchlorate and 0.67 ml. of 3-chlorobenzaldehyde there is obtained 1.5 g. of 1,1-dimethyl-3-(m-chlorostyryl)-1H-isobenzofurylium perchlorate, melting point 182°C., dec.

When the procedure described in example 2 is followed using 1.51 g. of 1,1-dimethyl-3-(m-chlorostyryl)-1H-isobenzofurylium perchlorate in place of 1,1-dimethyl-3-styryl-1H-isobenzofurylium perchlorate there is obtained the oxalate salt of N,N,3,3-tetramethyl-1-(m-chlorostyryl-1-phthalanpropylamine, melting point 192°-194° C.

EXAMPLE 7

Preparation of N,N,3,3-Tetramethyl-1-(m-methylstyryl)-1-phthalan-propylamine

In the manner described in example 1 from 1.3 g. of 1,1,3-trimethyl-1H-isobenzofurylium perchlorate and 0.71 ml. of 3-methylbenzaldehyde is obtained 1.41 g. of 1,1-dimethyl-3-(m-methylstyryl)-1H-isobenzofurylium perchlorate, melting point 185°C., dec.

In the manner described in example 2 using 1.41 g. of 1,1-dimethyl-3-(m-methylstyryl)-1H-isobenzofurylium perchlorate in place of 1,1-dimethyl-3-styryl-1H-isobenzofurylium perchlorate there is obtained the oxalate salt of N,N,3,3-tetramethyl-1-(m-methylstyryl)-1-phthalan-propylamine, melting point 206°-207° C.

EXAMPLE 8

Preparation of N,N,3,3-Tetramethyl-1-(3,4-dimethoxystyryl)-1-phthalanpropylamine Following the procedure described in example 1 from 2.15 g. of 1,1,3-trimethyl-1H-isobenzofurylium perchlorate and 1.63 g. of 3,4-dimethoxybenzaldehyde, there is obtained 3.08 g. of 1,1-dimethyl-3-(3,4-dimethoxystyryl)-1H-isobenzofurylium perchlorate, melting point 235°C., dec.

When the procedure of example 2 is followed using 1,1-dimethyl-3-(3,4-dimethoxystyryl)-1H-isobenzofurylium perchlorate in place of 1,1-dimethyl-3-styryl-1H-isobenzofurylium perchlorate there is obtained N,N,3,3-tetramethyl-1-(3,4-dimethoxystyryl)-1-phthalanpropylamine as a colorless oil. This product is purified by liquid partition chromatography on a diatomaceous silica support. The nmr spectrum of this substance has resonances at 92,95(C(CH$_3$)$_2$), 129 (N(CH$_3$)$_2$)229,231(OCH$_3$), 380 and 388 c.p.s. (vinyl H).

EXAMPLE 9

Preparation of N-Carbethoxy-N,3,3-trimethyl-1-sytryl-1-phthalan-propylamine

To a solution of 420 mg. of N,N,3,3-tetramethyl-1-styryl-1-phthalanpropylamine (prepared as in example 2) in 10 ml. of benzene is added dropwise 0.50 ml. of ethyl chlorocarbonate. The mixture is stirred at 25° C. for 15 minutes and then at 40° C. for 2 hours. The solution is cooled and washed with 2 N hydrochloric acid and water, then dried with magnesium sulfate and evaporated under reduced pressure giving 395 mg. of N-carbethoxy-N, 3,3-trimethyl-1-styryl-1-phthalanpropylamine as a gum.

EXAMPLE 10

Preparation of N,3,3-Trimethyl-1-styryl-1-phthalanpropylamine fumarate

A mixture of 395 mg. of N-carbethoxy-N, 3,3-trimethyl-1-styryl-1-phthalanpropylamine, prepared as described in example 9 in 5 ml. of diethyleneglycol monomethyl ether and 400 mg. of potassium hydroxide in 0.4 ml. of water is stirred and refluxed for 18 hours. The mixture is cooled and poured into 30 ml. of water. The aqueous solution is extracted with ether and the extracts washed with water. The ether solution is extracted with 20 percent acetic acid. The acid solution is made alkaline with sodium hydroxide and extracted with ether. The ether extract is washed with water, dried with magnesium sulfate and evaporated under reduced pressure producing N,3,3-trimethyl-1-styryl-1-phthalanpropylamine as a gum. The fumarate salt melts at 153°–155° C.

EXAMPLE 11

Preparation of N,N,-Dimethyl-1-styryl-1-phthalanpropylamine

When the procedure of example 2 is followed using phthalide in place of 3,3-dimethylphthalide there is formed 1-styryl-1-phthanol.

In the manner described in example 2 treatment of the above 1-styryl-1-phthanol with dimethylaminopropyl magnesium chloride gives 4-dimethylamino-1-styryl-1-(2-hydroxymethylphenyl)-butanol.

A solution of 500 mg. of the above 4-dimethylamino-1-styryl-1-(2-hydroxymethylphenyl)butanol in 2 ml. of 37 percent hydrochloric acid solution is heated at 90°–100° C. for 15 minutes. The solution is poured onto cracked ice, and the mixture is extracted with ether. The ether extracts are discarded, and the aqueous solution is rendered alkaline with potassium hydroxide. The mixture is extracted with ether and evaporation of the dried ethereal solution gives N,N,-dimethyl-1-styryl-1-phthalanpropylamine.

EXAMPLE 12

Preparation of N,N,3,3-Tetramethyl-1-(p-methoxystyryl-1-phthalanisobutylamine By the procedure of example 2, treatment of dimethylaminoisobutyl magnesium chloride (from 960 mg. of magnesium and 5.44 g. of dimethylaminoisobutyl chloride) in 20 ml. of tetrahydrofuran with 3.78 g. of 1,1-dimethyl-3-(p-methoxystyryl)-1H-isobenzofurylium perchlorate affords N,N,3,3-tetramethyl-1-(p-methoxystyryl)-1-phthalanisobutylamine, the oxalate salt of which has melting point 187°–190° C.

EXAMPLE 13

Preparation of N,N,-Diethyl-3,3-dimethyl-1-(p-methoxystyryl)-1-phthalanpropylamine Treatment of diethylaminopropyl magnesium chloride (from 960 mg. of magnesium and 6.00 g. of diethylaminopropyl chloride) in 25 ml. of tetrahydrofuran with 3.78 g. of 1,1-dimethyl-3-(p-methoxystyryl)-1H-isobenzofurylium perchlorate by the procedure described in example 2 produces N,N,-diethyl-3,3-dimethyl-1-(p-methoxystyryl)-1-phthalanpropylamine, boiling point 188° C., at 0.12 mm. of mercury pressure.

EXAMPLE 14

Preparation of N,N,3,3-Tetramethyl-1-(p-cyclohexylstyryl)-1-phthalanpropylamine In the manner described in example 1, 1,1-dimethyl-3-(p-cyclohexylstyryl)-1H-isobenzofurylium perchlorate is prepared from 1,1,3-trimethyl-1H-isobenzofurylium perchlorate and p-cyclohexylbenzaldehyde.

When the procedure of example 2 is followed using 1,1-dimethyl-3-(p-cyclohexylstyryl)-1H-isobenzofurylium perchlorate in place of 1,1-dimethyl-3-styryl-1H-isobenzofurylium perchlorate there is obtained N,N,3,3-tetramethyl-1-(p-cyclohexylstyryl)-1-phthalanpropylamine.

EXAMPLE 15

Preparation of N,N,3,3-Tetramethyl-1-[2-(2-thienyl)vinyl]-1-phthalanpropylamine Using the procedure of example 1, treatment of 1.10 g. of 1,1,3-trimethyl-1H-isobenzofurylium perchlorate with 0.61 g. of thiophene-2-carboxaldehyde in 20 ml. of glacial acetic acid affords 1.43 g. of 1,1-dimethyl-3[2-(2-thienyl)vinyl]-1-H-isobenzofurylium perchlorate as crystals, melting point 196°–198° C., dec.

Treatment of dimethylaminopropyl magnesium chloride (from 392 mg. of magnesium turnings and 1.96 g. of dimethylaminopropylchloride) in tetrahydrofuran with 1.43 g. of 1,1-dimethyl-3-[2-(2-thienyl)vinyl]-1H-isobenzofurylium perchlorate as described in example 2affords N,N,3,3-tetramethyl-1-[2-(2-thienyl)vinyl]-1-phthalanpropylamine, the oxalate salt of which crystallizes from ethanol as white crystals, melting point 181°–183° C.

EXAMPLE 16

Preparation of 4-[3-(3,3-Dimethyl-1-p-methoxystyryl-1-phthalan)-propyl]morpholine By the procedure of example 2 reaction of 1,1-trimethyl-3-(p-methoxystyryl)-1H-isobenzofurylium perchlorate with 3-(4-morpholinyl)propyl magnesium chloride gives 4-[3-(3,3-dimethyl-1-p-methoxystyryl-1-phthalan)propyl]morpholine.

EXAMPLE 17

Preparation of N,N,3,3-Tetramethyl-1-(3,4,5-trimethoxystyryl)-1-phthalanpropylamine Oxalate In the manner described in example 1, reaction of 1.09 g. of 1,1,3-trimethyl-1H-isobenzofurylium perchlorate with 0.89 g. of 3,4,5-trimethoxybenzaldehyde in 20 ml. of glacial acetic acid gives 600 mg. of 1,1-dimethyl-3-(3,4,5-trimethoxystyryl)-1H-isobenzofurylium perchlorate, melting point 182°–184° C.

By the procedure of example 2, treatment of dimethylaminopropyl magnesium chloride (from 134 mg. of magnesium and 675 mg. of dimethylaminopropylchloride) in tetrahydrofuran with 600 mg. of 1,1-dimethyl-3-(3,4,5- trimethoxystyryl)-1H-isobenzofurylium perchlorate furnishes N,N,3,3-tetramethyl1 1-(3,4,5-trimethylstyryl)-1-phthalan-propylamine, the oxalate salt of which crystallizes as a hydrate from ethanol in the form of white crystals, melting point 132°–135° C.

EXAMPLE 18

Preparation of 1-[3-(3,3-Dimethyl-1-p-methoxystyryl-1-phthalan)-propyl]pyrrolidine By the procedure of example 2 reaction of 1,1-trimethyl-3-(p-methoxystyryl)-1H-isobenzofurylium perchlorate with 3-(1-pyrrolidino)propyl magnesium chloride affords 1-[3-(3,3-dimethyl-1-p-methoxystyryl-1-phthalan)propyl]pyrrolidine.

EXAMPLE 19

Preparation of N,N,3,3-Tetramethyl-1-(p-phenylstyryl)-1-phthalanpropylamine Oxalate In the manner described in example 1, reaction of 3.30 g. of 1,1,3-trimethyl-1H-isobenzofurylium perchlorate with 2.30 g. of 4-biphenylylcarboxaldehyde in glacial acetic acid furnishes 4.85 g. of 1,1-dimethyl-3-(p-phenylstyryl)-1H-isobenzofurylium perchlorate, melting point 218° C., dec.

Treatment of dimethylaminopropyl magnesium chloride (from 0.96 g. of magnesium turnings and 4.88 g. of dimethylaminopropylchloride) with 4.25 g. of 1,1-dimethyl-3-(p-phenylstyryl)-1H-isobenzofurylium perchlorate as described in example 2 affords N,N,3,3-tetramethyl-1-(p-phenylstyryl)-1-phthalanpropylamine, the oxalate salt of which crystallizes from ethanol as white crystals, melting point 186°–187° C.

EXAMPLE 20

Preparation of N-Butyl-N,3,3-trimethyl-1-(p-methoxystyryl)-1-phthalanpropylamine By the procedure of example 2, reaction of 1,1-trimethyl-3-(p-methoxystyryl)-1H-isobenzofurylium perchlorate with 3-(N-butyl-methylamino)propyl magnesium chloride produces N-butyl-N,3,3-trimethyl-1-(p-methoxystyryl)-1-phthalanpropylamine.

EXAMPLE 21

Preparation of 1-(3,3-Dimethyl-1-styryl-1-phthalanpropyl)piperidine

Treatment of 3-(1-piperidino)propyl magnesium chloride (from 830 mg. of magnesium and 5.58 g. of 1-(3-chloropropyl)-piperidine) in 20 ml. of tetrahydrofuran with 3.00 g. of 1,1-dimethyl-3-styryl-1H-isobenzofurylium perchlorate in the manner described in example 2 affords 1-(3,3-dimethyl-1-styryl-1-phthalanpropyl)piperidine, the oxalate salt of which crystallizes from water or ethanol as white crystals, melting point 145°–147° C.

EXAMPLE 22

Preparation of N,N,3,3-Tetramethyl-1-(p-methoxystyryl)-1-phthalanbutylamine

By the procedure of example 2 reaction of 1,1-trimethyl-3-(p-methoxystyryl)-1H-isobenzofurylium perchlorate with 4-dimethylaminobutyl magnesium chloride affords N,N,3,3-tetramethyl-1-(p-methoxystyryl)-1-phthalanbutylamine.

EXAMPLE 23

Preparation of N,N,3,3-Tetramethyl-1-(α-methylstyryl)-1-phthalanpropylamine

To a stirred, refluxing solution of 3.2 g. (0.02 mole) of 3,3-dimethylphthalide in 10 ml. of tetrahydrofuran is added 20 ml. of a tetrahydrofuran solution of α-methylstyryl magnesium bromide [from 5.91 g. (0.03 mole) of β-bromo-α-methylstyrene and 720 mg. (0.03 g.-atom) of magnesium]. The mixture is stirred at reflux temperature for 18 hours, cooled to ice-bath temperature and treated with ammonium chloride solution. The mixture is extracted with ether, and the dried extracts are evaporated under reduced pressure to furnish 3,3-dimethyl-1-(α-methylstyryl)-1-phthalanol.

A solution of the above 3,3-dimethyl-1-(α-methylstyryl)-1-phthalanol in ether is treated with a solution of perchloric acid in ether to afford 1,1-dimethyl-3-(α-methylstyryl)-1H-isobenzofurylium perchlorate.

To a stirred solution of dimethylaminopropyl magnesium chloride (from 288 mg. of magnesium and 1.46 g. of dimethylaminopropyl chloride) in 25 ml. of tetrahydrofuran is added in several portions 1.13 g. of the above 1,1-dimethyl-3-(α-methylstyryl)-1H-isobenzofurylium perchlorate. The mixture is heated at reflux for 6 hours, then cooled, decomposed with saturated ammonium chloride, and extracted with ether. The ether solution is extracted with 20 percent acetic acid, and the acid extracts are rendered alkaline by addition of potassium hydroxide pellets. The resulting mixture is extracted with ether, and the dried extracts are evaporated to give N,N,3,3-tetramethyl-3-(α-methylstyryl)-1-phthalanpropylamine.

EXAMPLE 24

Preparation of 1-Methyl-4-[(3,3-dimethyl-1-styryl)-1-phthalanpropyl]piperazine

By the procedure of example 2, treatment of 4-methyl-1-piperazinylpropyl magnesium chloride (from 960 mg. of magnesium and 7.08 g. of 4-methyl-1-piperazinylpropyl chloride) in tetrahydrofuran with 3.48 g. of 1,1-dimethyl-3-styryl-1H-isobenzofurylium perchlorate gives 1-methyl-4-[(3,3-dimethyl-1-styryl)-1-phthalanpropyl]piperazine.

EXAMPLE 25

Preparation of 1-Carbethoxy-4-[(3,3-dimethyl-1-styryl)-1-phthalanpropyl]-piperazine A solution of 1-methyl-4-[(3,3-dimethyl-1-styryl)-1-phthalanpropyl]piperazine in benzene is treated with ethyl chlorocarbonate. The mixture is stirred at ambient temperatures for 2 hours whereafter it is washed successively with 2 N hydrochloric acid solution and water. The dried organic solution is evaporated under reduced pressure to furnish 1-carbethoxy-4-[(3,3-dimethyl-1-styryl)-1-phthalanpropyl]piperazine.

EXAMPLE 26

Preparation of 1-[(3,3dimethyl-1-styryl)-1-phthalanpropyl]-piperazine

A mixture of 410 mg. of 1-carbethoxy-4-[(3,3-dimethyl-1-styryl)-1-phthalanpropyl]piperazine in 5 ml. of diethyleneglycol monomethyl ether and 450 mg. of potassium hydroxide in 0.5 ml. of water is stirred at reflux temperature for 18 hours. The mixture is cooled and poured into water. The aqueous solution is extracted with ether, and the extracts are washed with water. The organic solution is extracted with 20 percent acetic acid, and the combined acid extracts are rendered alkaline with potassium hydroxide. The resulting mixture is extracted with ether, and the dried ethereal extracts are evaporated under reduced pressure to furnish 1-[(3,3-dimethyl-1-styryl)-1-phthalanpropyl]piperazine.

EXAMPLE 27

Preparation of N,N,3,3-Tetramethyl-1-(p-bromostyryl)-1-phthalanpropylamine

In the manner described in example 1 from 2.00 g. of 1,1,3-trimethyl-1H-isobenzofurylium perchlorate and p- bromobenzaldehyde is obtained, 2.88 g. of 1,1-dimethyl-3-(p-bromostyryl)-1H-isobenzofurylium perchlorate, melting point 196°–199° C. dec.

In the manner described in example 2, using 1,1-dimethyl-3-(p-bromostyryl)-1H-isobenzofurylium perchlorate in place of 1,1-dimethyl-3-styryl-1H-isobenzofurylium perchlorate, there is obtained N,N,3,3-tetramethyl-1-(p-bromostyryl)-1-phthalanpropylamine, the oxalate salt of which has melting point 219°–220° C.

EXAMPLE 28

Preparation of N,N,3,3-Tetramethyl-1-(p-methoxystyryl)-1-phthalanpentylamine

By the procedure of example 2, reaction of 1,1-trimethyl-3-(p-methoxystyryl)-1H-isobenzofurylium perchlorate with 5-dimethylaminopentyl magesium chloride produces N,N,3,3-tetramethyl-1-(p-methoxystyryl-1-phthalanpentylamine.

EXAMPLE 29

Preparation of N,N,3,3-Tetramethyl-1-[2-(2-naphthyl)vinyl]-1-phthalanpropylamine In the manner described in example 1 from 2.0 g. of 1,1,3-trimethyl-1H-isobenzofurylium perchlorate and 2-naphthaldehyde is obtained 3.00 g. of 1,1-dimethyl-3-[2-(2-naphthyl)-vinyl]-1H-isobenzofurylium perchlorate, melting point 243° C., dec.

In the manner described in example 2 using 1,1-dimethyl-3-[2-(2-naphthyl)vinyl]-1H-isobenzofurylium perchlorate in place of 1,1-dimethyl-3-styryl-1H-isobenzofurylium perchlorate there is obtained N,N,3,3-tetramethyl-1[2-(2-naphthyl)vinyl]-1-phthalanpropylamine, the oxalate salt of which melts at 155°–165° C.

EXAMPLE 30

Preparation of N,N,3,3-Tetramethyl-1-[2-(5-indanyl)vinyl]-1-phthalanpropylamine

In the manner described in example 1 from 2.1 g. of 1,1,3-trimethyl-1H-isobenzofurylium perchlorate and 5-indanecarboxaldehyde is obtained 3.05 g. of 1,1-dimethyl-3-[2-(5-indanyl)vinyl]-1H-isobenzofurylium perchlorate, melting point 204°–205° C.

In the manner described in example 2 using 1,1-dimethyl-3-[2-(5-indanyl)vinyl]-1H-isobenzofurylium perchlorate in place of 1,1-dimethyl-3-styryl-1H-isobenzofurylium perchlorate, there is obtained N,N,3,3-tetramethyl-1-[2-(5-indanyl)vinyl]-1-phthalanpropylamine, the oxalate salt of which melts at 196°–198° C.

EXAMPLE 31

Preparation of N,N,3,3-Tetramethyl-1-[2-(1-naphthyl)vinyl]-1-phthalanpropylamine Using the procedure described in example 1, from 2.1 g. of 1,1,3-trimethyl-1H-isobenzofurylium perchlorate and 1-naphthaldehyde there is obtained 2.93 g. of 1,1-dimethyl-3-[2-(1-naphthyl)vinyl]-1H-isobenzofurylium perchlorate, melting point 209°–210° C.

In the manner described in example 2 using 1,1-dimethyl-3-[2-(1-naphthyl)vinyl]-1H-isobenzofurylium perchlorate in place of 1,1-dimethyl-3-styryl-1H-isobenzofurylium perchlorate there is obtained N,N,3,3-tetramethyl-1[2-(1-naphthyl)vinyl]-1-phthalanpropylamine, the oxalate salt of which melts at 191°–192° C.

EXAMPLE 32

Preparation of N,N,3,3-Tetramethyl-1-[2-(4-methoxy-1-naphthyl)-vinyl]-1-phthalanpropylamine When the procedure described in example 1 is used from 2.1 g. of 1,1,3-trimethyl-1H-isobenzofurylium perchlorate and 1.86 g. of 4-methoxy-1-naphthaldehyde is obtained 3.42 g. of 1,1-dimethyl-3-[2-(4-methoxy-1-naphthyl)vinyl]-1H-isobenzofurylium perchlorate, melting point 252° C., dec.

In the manner described in example 2 using 1,1-dimethyl-3-[2-(4-methoxy-1-naphthyl)vinyl]-1H-isobenzofurylium perchlorate in place of 1,1-dimethyl-3-styryl-1H-isobenzofurylium perchlorate there is obtained N,N,3,3-tetramethyl-1-[2-(4-methoxy-1-naphthyl)vinyl]-1-phthalanpropylamine, the oxalate salt of which melts at 158°–170° C.

EXAMPLE 33

Preparation of N,N,3,3-Tetramethyl-1-(p-isopropylstyryl)-1-phthalanpropylamine

In the manner described in example 1 from 2.1 g. of 1,1,3-trimethyl-1H-isobenzofurylium perchlorate and 1.48 g. of p-isopropylbenzaldehyde is obtained 1.79 g. of 1,1-dimethyl-3-(p-isopropylstyryl)-1H-isobenzofurylium perchlorate, melting point 180°–183° C., dec.

In the manner described in example 2 using 1,1-dimethyl-3-(p-isopropylstyryl)-1H-isobenzofurylium perchlorate in place of 1,1-dimethyl-3-styryl-1H-isobenzofurylium perchlorate there is obtained N,N,3,3-tetramethyl-1-(p-isopropylstyryl)-1-phthalanpropylamine. The nmr spectrum of this substance has resonances at 73 (CH(CH$_3$)$_2$) 91, 94.5 (C(CH$_3$)$_2$, 128.5(N(CH$_3$C2), 170 (CH(CH$_3$)$_2$), 385 and 390 c.p.s. (vinyl H).

EXAMPLE 34

Preparation of N,N3,3-Tetramethyl-1-[2-(2-furyl)vinyl]-1-phthalanpropylamine

Using the procedure described in example 1, from 2.1 g. of 1,1,3-trimethyl-1H-isobenzofurylium perchlorate and 0.96 g. of 2-furancarboxaldehyde there is obtained 2.35 g. of 1,1-dimethyl-3-[2-(2-furyl)vinyl]-1H-isobenzofurylium perchlorate, melting point 169°–170° C., dec.

In the manner described in example 2 using 1,1-dimethyl-3-[2-(2-furanyl)vinyl]-1H-isobenzofurylium perchlorate in place of 1,1-dimethyl-3-styryl-1H-isobenzofurylium perchlorate there is obtained N,N,3,3-tetramethyl-1-[2-(2-furyl)vinyl]-1-phthalanpropylamine, the oxalate salt of which melts at 165°–167° C.

EXAMPLE 35

Preparation of 3,3-Diethyl-N,N-dimethyl-1-(p-methoxy-$\beta$-methylstyryl)-1-phthalanpropylamine To a stirred, boiling solution of 20 ml. of 3 M etheral ethyl magnesium bromide in 80 ml. of tetrahydrofuran is added dropwise over 20 minutes a solution of 9.50 g. of 3,3-diethylphthalide in 50 ml. of tetrahydrofuran. The solution is stirred and heated at reflux temperature for 1 hour after completion of the addition. The solution is cooled in an ice-bath and treated with 30 ml. of a saturated ammonium chloride solution followed by 10 ml. of a 20 percent hydrochloric acid solution. The organic phase is separated, and the aqueous phase is extracted with ether. The combined organic solutions are washed successively with water, and 5 percent sodium carbonate solution and water, dried with magnesium sulfate and evaporated under reduced pressure to furnish 2-(1-ethyl-1-hydroxpropyl)propiophenone as an amber oil.

A solution of 1.08 g. of the above 2-(ethyl-1-hydroxypropyl)propiophenone and 0.65 ml. of p-methoxybenzaldehyde in 10 ml. of glacial acetic acid is treated with 0.42 ml.

of 70–72 percent perchloric acid and stirred at ambient temperature for 10 minutes. An additional 0.65 ml. of p-methoxybenzaldehyde is added and the solution is heated at reflux temperature for 30 minutes. The solution is cooled in an ice-bath and addition of 30 ml. of ether causes the precipitation of 1.34 g. of 1,1-diethyl-3-(p-methoxy-β-methylstyryl)-1H-isobenzofurylium perchlorate as red crystals, melting point 145°–147° C., dec.

When the procedure of example 2 is followed, using 1,1-diethyl-3-(p-methoxy-β-methylstyryl)-1H-isobenzofurylium perchlorate in place of 1,1-dimethyl-3-styryl-1H-isobenzofurylium perchlorate, there is obtained the oxalate salt of 3,3-diethyl-N,N-dimethyl-1-(p-methoxy-β-methylstyryl)-1-phthalanpropylamine, melting point 94°–98° C.

EXAMPLE 36

Preparation of {3-[3,3-Dimethyl-1-(p-methylstyryl)-1-phthalanyl]-propyl} trimethylammonium iodide To a solution of 320 mg. of N,N,3,3-tetramethyl-1-(p-methylstyryl)-1-phthalanpropylamine in 30 ml. of ether is added a solution of 1.0 ml. of methyl iodide in 20 ml. of ether. The resultant precipitate is collected after 18 hours and recrystallized from acetone-petroleum ether (30°–60°) affording 264 mg. of white crystals, melting point 179°–180° C.

EXAMPLE 37

Preparation of N,N,3,3-Tetramethyl-1-(m-trifluoromethylstyryl)-1-phthalanpropylamine Using the procedure of example 1, treatment of 1,1,3-trimethyl-1H-isobenzofurylium perchlorate with m-trifluoromethyl-benzaldehyde in glacial acetic acid produces 1,1-dimethyl-3-(m-trifluoromethylstyryl)-1H-isobenzofurylium perchlorate.

Treatment of dimethylaminopropyl magnesium chloride with 1,1-dimethyl-3-(m-trifluoromethylstyryl)-1H-isobenzofurylium perchlorate as described in example 2 produces N,N,3,3-tetramethyl-1-(m-trifluoromethylstyryl)-1-phthalanpropylamine.

We claim:
1. A substituted phthalan of the formula:

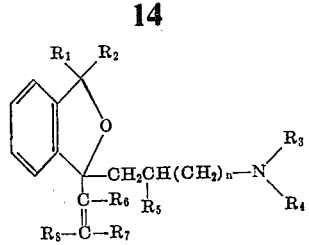

wherein $R_1$ and $R_2$ are members selected from the group consisting of hydrogen and lower alkyl; $R_3$ is a member selected from the group consisting of hydrogen, lower alkyl, and lower alkoxycarbonyl; $R_4$ is lower alkyl; $R_3$ and $R_4$ taken together with nitrogen

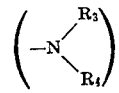

is a member selected from the group consisting of 4-morpholinyl, pyrrolidinyl, piperidinyl, 1-lower alkyl-4-piperazinyl, 1-piperazinyl and 1-lower alkoxy carbonyl-4-piperazinyl; $R_5$ is selected from the group consisting of hydrogen and lower alkyl; $R_6$ and $R_7$ are members selected from the group consisting of hydrogen, and lower alkyl; $R_8$ is a member selected from the group consisting of thienyl, furyl, indanyl, naphthyl, lower alkoxynaphthyl, phenyl, cyclohexylphenyl, halophenyl, lower alkylphenyl, methoxyphenyl, dimethoxyphenyl, trimethoxyphenyl, and biphenyl; $n$ is an integer of 1 to 3, and nontoxic acid addition salts thereof.

2. The substituted phthalan according to claim 1: N,N,3,3-tetramethyl-1-styryl-1-phthalanpropylamine.

3. The substituted phthalan according to claim 1: N,N,3,3-tetramethyl-1-(p-methylstyryl)-1-phthalanpropylamine.

4. The substituted phthalan according to claim 1: N,N,3,3-tetramethyl-1-(p-methoxystyryl)-1-phthalanpropylamine.

5. The substituted phthalan according to claim 1: N,N,3,3-tetramethyl-1-(o-methylstyryl)-1-phthalanpropylamine.

6. The substituted phthalan according to claim 1: N,N,3,3-tetramethyl-1-(3,4-dimethoxystyryl)-1-phthalanpropylamine.

7. The substituted phthalan according to claim 1: N,N,3,3-tetramethyl-1-[2-(2-furyl)vinyl]-1-phthalanpropylamine.

8. The substituted phthalan according to claim 1: N,3,3-trimethyl-1-styryl-1-phthalanpropylamine.